United States Patent
Tost (12)

(10) Patent No.: US 6,192,677 B1
(45) Date of Patent: Feb. 27, 2001

(54) APPARATUS AND METHOD FOR THE AFTER-TREATMENT OF EXHAUST GASES FROM AN INTERNAL COMBUSTION ENGINE OPERATING WITH EXCESS AIR

(75) Inventor: Rainer Tost, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/456,124

(22) Filed: Dec. 7, 1999

(30) Foreign Application Priority Data

Dec. 7, 1998 (DE) .............................. 198 56 366

(51) Int. Cl.[7] ..................................................... F01N 3/00
(52) U.S. Cl. ................. 60/286; 60/293; 60/301; 60/303; 60/307
(58) Field of Search ............................. 60/286, 293, 301, 60/303, 307, 323

(56) References Cited

U.S. PATENT DOCUMENTS

| | | | | |
|---|---|---|---|---|
| 3,868,819 | * | 3/1975 | Knapp ..................................... | 60/285 |
| 4,576,617 | * | 3/1986 | Renevot ................................. | 60/303 |
| 5,605,042 | | 2/1997 | Stutzenberger . | |
| 5,665,318 | * | 9/1997 | Rembold et al. ...................... | 60/303 |
| 6,041,594 | * | 3/2000 | Brenner et al. ........................ | 60/303 |
| 6,050,088 | * | 4/2000 | Brenner ................................. | 60/303 |
| 6,082,102 | * | 7/2000 | Wissler et al. ......................... | 60/303 |
| 6,085,519 | * | 7/2000 | Prior et al. ............................. | 60/293 |

FOREIGN PATENT DOCUMENTS

| | | | | |
|---|---|---|---|---|
| 4436397A1 | | 4/1996 | (DE) . | |
| 0117534 | * | 9/1984 | (EP) ...................................... | 60/286 |
| 0216019 | * | 10/1985 | (JP) ....................................... | 60/303 |

OTHER PUBLICATIONS

"A Controlled Exhaust Gas Aftertreatment System to Fulfill Future Emission Limits for Passenger Car Diesel Engines" (Schöppe et al.) the 17th International Vienna Symposium, 1996, pp. 332–353.

* cited by examiner

Primary Examiner—Thomas Denion
Assistant Examiner—Diem Tran
(74) Attorney, Agent, or Firm—Herbert L. Lerner; Laurence A. Greenberg; Werner H. Stemer

(57) ABSTRACT

An injection valve of a reducing agent metering device is enclosed in a double-walled valve holding element that is connected directly to the exhaust-gas line. It is thereby possible to blow pressurized air into an air gap between an outer wall and an inner wall of the valve holding element and, as a result, to cool at least those parts of the injection valve that are in close vicinity to the exhaust gas.

20 Claims, 2 Drawing Sheets

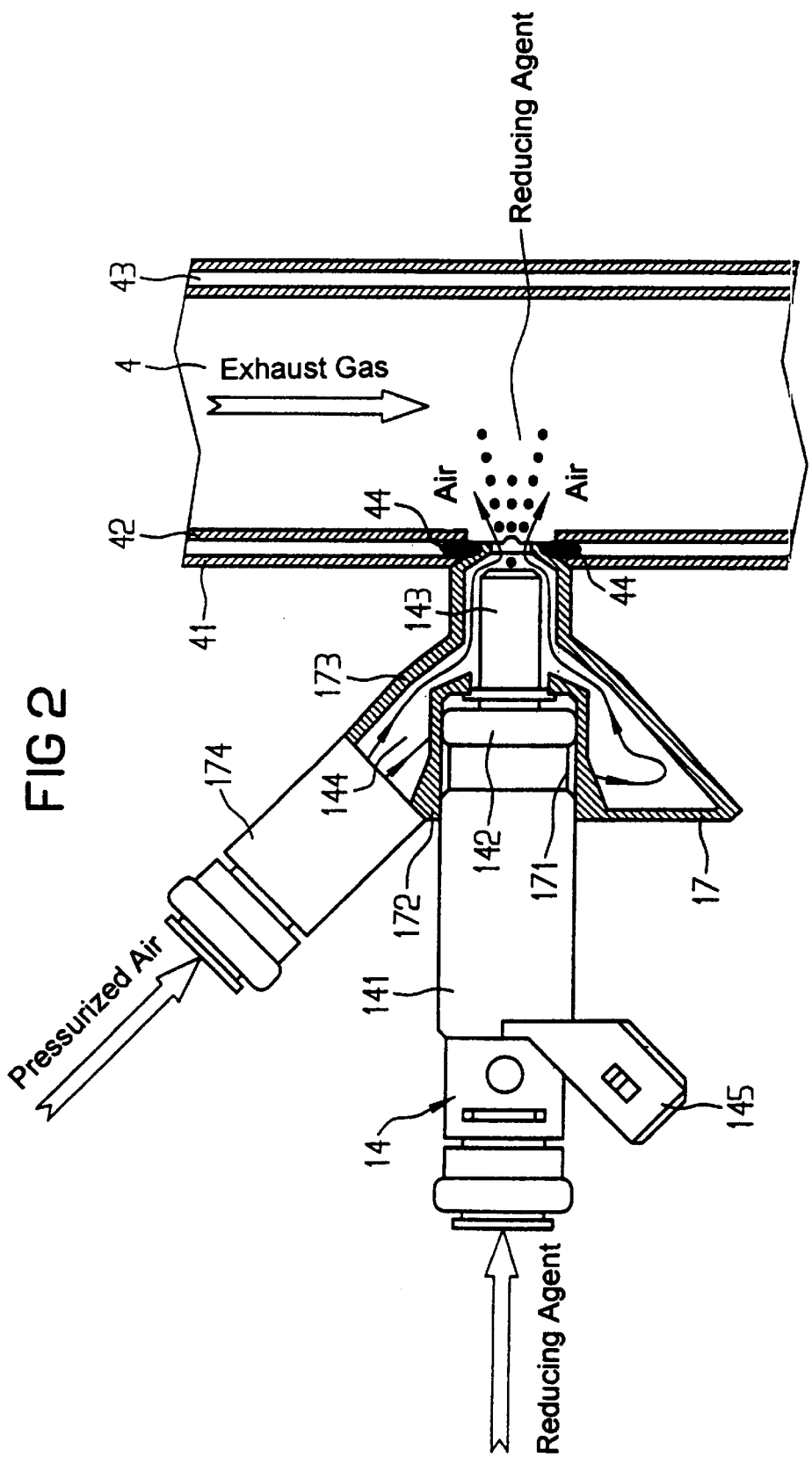

APPARATUS AND METHOD FOR THE AFTER-TREATMENT OF EXHAUST GASES FROM AN INTERNAL COMBUSTION ENGINE OPERATING WITH EXCESS AIR

BACKGROUND OF THE INVENTION

Field of the Invention

The invention relates to an apparatus and a method for the after-treatment of exhaust gases originating from an internal combustion engine operating with excess air. The apparatus has an exhaust-gas after-treatment system with a reduction catalytic converter for reducing NOx components in the exhaust gas, an electrically driven metering device for the controlled introduction of reducing agent into an exhaust-gas line, upstream of the reduction catalytic converter, and a device for cooling the metering device. In the corresponding method, $NO_x$ components in the exhaust gas are reduced by means of the reduction catalytic converter, reducing agent is introduced into an exhaust-gas line upstream of the reduction catalytic converter, by the electrically driven metering device, and the metering device is cooled by means of a device.

Diesel internal combustion engines and lean-burn spark-ignition internal combustion engines, in which fuel is injected directly into the combustion chamber in the cylinder, have a tendency toward high $NO_x$ emissions because of the high excess of oxygen with which they are operated. The so-called selective catalytic reduction (SCR) method is known for reducing the $NO_x$ content in the exhaust gas from such internal combustion engines. Here, a reducing agent is introduced into the exhaust-gas stream at a point upstream of a reduction catalytic converter, in the exhaust gas flow direction, with the aid of an electrically driven metering device, and converts the nitrogen oxides contained in the exhaust gas into harmless nitrogen $N_2$ and water $H_2O$ in the presence of oxygen at the reduction catalytic converter.

Such a method is described, for example, by Schoppe et al. in the publication "Ein geregeltes Abgasnachbehandlungssystem zur Erfüllung zukünftiger Emissionsgrenzwerte bei PKW-Diesel-motoren" [A Controlled Exhaust Gas Aftertreatment System to Fulfill Future Emission Limits for Passenger Car Diesel Engines], 17th International Vienna Motor Symposium, 1996, Vol. 1. The reducing agent used can be ammonia $NH_3$, but for reasons of its ability to be handled, an aqueous solution of urea is normally used. However, it is also possible to use fuel or derivatives as a reducing agent.

In such exhaust-gas after-treatment systems, a control device of the internal combustion engine, or a separate control device, often referred to as a $DeNO_x$ control device, continuously calculates the intended quantity of reducing agent to be metered on the basis of operating parameters of the internal combustion engine, such as the quantity of fuel introduced into the combustion chamber, the operating temperature and the rotational speed, as well as the temperature of the reduction catalytic converter, for example.

The metering device used in this case is preferably a conventional injection valve, such as is used, for example, in a low-pressure gasoline injection system. In accordance with the changed intended use of such an injection valve, namely of injecting reducing agent, for example urea, at least those components of the valve which are directly exposed to the urea are produced from urea-resistant materials (noble metal, coated plastic), and the geometry of the outlet opening of the valve is adapted to the quantities to be ejected, which are smaller than when metering fuel.

The use of conventional low-pressure gasoline injection valves is generally permissible only up to a specific temperature, typically about 130° C. The reason for this lies in the coil construction, in particular the insulation of the coils for the electromagnetic drive and the thermal resistances of the materials used, for example of the seals.

Since the injection valve is arranged directly on the exhaust-gas pipe, upstream of the reduction catalytic converter, this maximum temperature is almost always reached outside the warming-up phase of the internal combustion engine.

However, if the injection valve or at least parts thereof are heated above this maximum permissible temperature for a relatively long time, then functional disruption occurs, up to the complete failure of the injection valve.

In addition, an excessively high temperature at the injection valve has negative influences on the reducing agent to be introduced. In the case where aqueous urea solution is used as the reducing agent, the solution must not be heated above specific temperature limits, since otherwise the aqueous urea solution begins to decompose thermally or to crystallize out.

In order to solve this thermal problem, it is possible to provide a relatively long line connection between the metering point of the reducing agent and the point of entry into the exhaust gas. Here, however, there is the risk that the urea, which is already finely distributed, will recombine again to form large droplets, and that an irregular metering rate will occur.

Another possibility for cooling the injection valve, in the case of a so-called bottom-fed injection valve, is to flush part of the valve body continuously with an aqueous urea solution and in this way to carry away the heat. This assumes that there is a continuous urea circuit from the urea tank to the injection valve and back which, of course, entails a considerable constructional outlay.

In accordance with U.S. Pat. No. 5,605,042 (German published patent application DE 44 36 397 A1), reducing agent is introduced into the exhaust-gas fed to the reduction catalytic converter with an electrically controlled metering valve that is combined with a control valve in a common housing. The control valve is used for the controlled introduction of supplied pressurized air, in which a stored quantity of reducing agent processed via the metering valve is added intermittently to the exhaust gas. The control valve and the metering valve are arranged in a common supporting body, around which there flows cooling water from the coolant loop of the internal combustion engine. Although, by means of such a configuration, the maximum temperature at the end of the injection-valve holder can be limited to the coolant temperature (max. 90°–100° C.) and the temperature stress on the urea circuit can be relieved, a cooling jacket, lines and hose connections are additionally needed.

SUMMARY OF THE INVENTION

It is accordingly an object of the invention to provide an apparatus and a method for the after-treatment of exhaust gases from an internal combustion engine operated with excess air, which overcomes the above-mentioned disadvantages of the heretofore-known devices and methods of this general type and in which or with which the reducing agent can be introduced by a low-pressure gasoline injection valve, and the thermal loading on the injection valve is as small as possible.

With the foregoing and other objects in view there is provided, in accordance with the invention, an apparatus for after-treating exhaust gases of an internal combustion engine operating with excess air, comprising:

a reduction catalytic converter for reducing $NO_x$ components in an exhaust gas flowing in an exhaust gas line of an internal combustion engine;

an electrically driven metering device for controlled injection of reducing agent into the exhaust-gas line upstream of the reduction catalytic converter in a flow direction of the exhaust gas, the metering device having an injection valve and a double-walled valve holding element enclosing the injection valve and directly communicating with the exhaustgas line, the double-walled valve holding element having an outer wall and an inner wall and an air gap formed therebetween; and a device for cooling the metering device, including a pressurized-air generating device connected to blow pressurized air into the air gap between the outer wall and the inner wall of the valve holding element, for cooling the injection valve in vicinity of the exhaust gas line.

By enclosing the injection valve of the metering device in a double-walled valve holding element that is connected directly to the exhaust-gas line, it is made possible to blow pressurized air into an air gap between an outer wall and an inner wall of the valve holding element and, as a result, to cool at least those parts of the injection valve which are close to the exhaust gas.

In accordance with an added feature of the invention, the valve holding element is attached to a wall of the exhaust gas line and the wall is formed with a throughhole for the reducing agent to be introduced, and wherein the valve holding element is formed, on a side facing away from the exhaust-gas line, with a recess matched to a diameter of the injection valve and is bounded by the inner wall such that, when the injection valve is installed, an outlet opening of the injection valve is located slightly in front of or at a level of the wall of the exhaust-gas line.

In accordance with an additional feature of the invention, an outer contour of the valve holding element tapers in a funnel shape towards the exhaust-gas line, such that an injection-valve body of the injection valve and a valve tip of the injection valve, having a smaller diameter than the injection-valve body, are both surrounded by the air gap.

In accordance with another feature of the invention, the outer wall of the valve holding element is permanently attached to a wall of the exhaust-gas line.

In accordance with a further feature of the invention, a longitudinal axis of the injection valve is oriented substantially perpendicular to the wall of the exhaust-gas line. In an alternative embodiment, the longitudinal axis of the injection valve encloses an acute angle with the wall of the exhaust-gas line, relative to a flow direction of the exhaust gas.

In accordance with an advantageous feature of the invention, the valve holding element is formed of metallic materials. In the alternative, it is formed of ceramic materials, or of a temperature-resistant plastic material.

In accordance with again an added feature of the invention, the pressurized-air generating device is an electrically driven pump. Even after the internal combustion engine has been switched off, it can be ensured that pressurized air continues to be delivered for a specific time and the residual heat from the exhaust-gas system is therefore prevented from heating up the injection valve.

In the alternative, the pressurized-air generating device is a pump mechanically driven by the internal combustion engine.

In accordance with again an additional feature of the invention, there is provided a pressurized-air line connecting the pressurized-air generating device to the valve holding element, and a pressure reservoir communicating with the pressurized-air line. In this advantageous refinement of the invention, the maintenance of the cooling function after the internal combustion engine has been switched off is achieved by means of the pressure reservoir.

In accordance with again another feature of the invention, a check valve is inline connected in the pressurized-air line connecting the pressurized-air generating device to the valve holding element.

With the above and other objects in view there is provided, in accordance with the invention, a method of after-treating exhaust gases from an internal combustion engine operating with excess air and having an exhaust-gas after-treatment system, which comprises:

introducing reducing agent into an exhaust-gas line with an electrically driven metering device comprising an injection valve enclosed by a double-walled valve holding element connected directly to the exhaust-gas line;

generating pressurized air with a pressurized-air generating device and blowing the pressurized air into an air gap between an outer wall and an inner wall of the double-walled valve holding element, and thereby cooling at least those parts of the injection valve in vicinity to the exhaust gas by means of the pressurized air; and reducing $NO_x$ components in the exhaust gas by means of a reduction catalytic converter disposed downstream of the metering device, in an exhaust gas flow direction.

In accordance with yet an added feature of the invention, the pressurized air is generated with an electrically driven pump, and the pump is kept active for a given time period after the internal combustion engine has been switched off. In the alternative, the control variable may be the temperature at the exhaust gas line, i.e., the pump may be maintained in the activated state until the temperature in the exhaust-gas line falls below a predefined value.

Where the pressure reservoir is provided, which is being filled with pressurized-air during the operation of the internal combustion engine and the metering device, it is possible to continue feeding pressurized air for cooling the injection valve after the internal combustion engine has been switched off and the metering device has been deactivated.

In accordance with a particularly advantageous feature of the invention, the generating step comprises branching pressurized air from a pressurized-air circuit for controlling other functions of a vehicle driven by the internal combustion engine. For instance, the exhaust-gas after-treatment system may be used in a utility vehicle which has an existing pressurized-air circuit for controlling functions, such as the braking system. The pressurized air needed for cooling is fed to the injection valve by means of a tapping. As a result, any additional components for generating pressure are dispensed with.

In accordance with a concomitant feature of the invention, the generating step comprises branching off pressurized air via a throttled branch downstream of a charging-air cooler of a supercharged internal Combustion engine. In other words, the novel exhaust-gas after-treatment system may also be used in a simple way and without great outlay in a supercharged internal combustion engine. The pressurized air for cooling the injection valve is in this case taken via a throttled branch downstream of the charging-air cooler.

In summary, the double-walled holder for the injection valve, and the introduction of pressurized air into the air gap between the two walls of the holder, result overall in a very simply constructed and cost-effective possibility for cooling the injection valve. The reducing agent is no longer heated above the critical temperature, and therefore no thermal decomposition of the reducing agent takes place.

All that is needed is a spur line from the reducing-agent pump to the injection valve, and a return line to the reducing-agent container can be dispensed with.

Other features which are considered as characteristic for the invention are set forth in the appended claims.

Although the invention is illustrated and described herein as embodied in an apparatus and method for the after-treatment of exhaust gases from an internal combustion engine operating with excess air, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an enlarged schematic illustration of a second exemplary embodiment of the apparatus according to the invention, shown without the reducing-agent and pressurized-air circuits.

DESCRIPTION OF THE PREFERRED EMBODIMENTS

Figure 1:
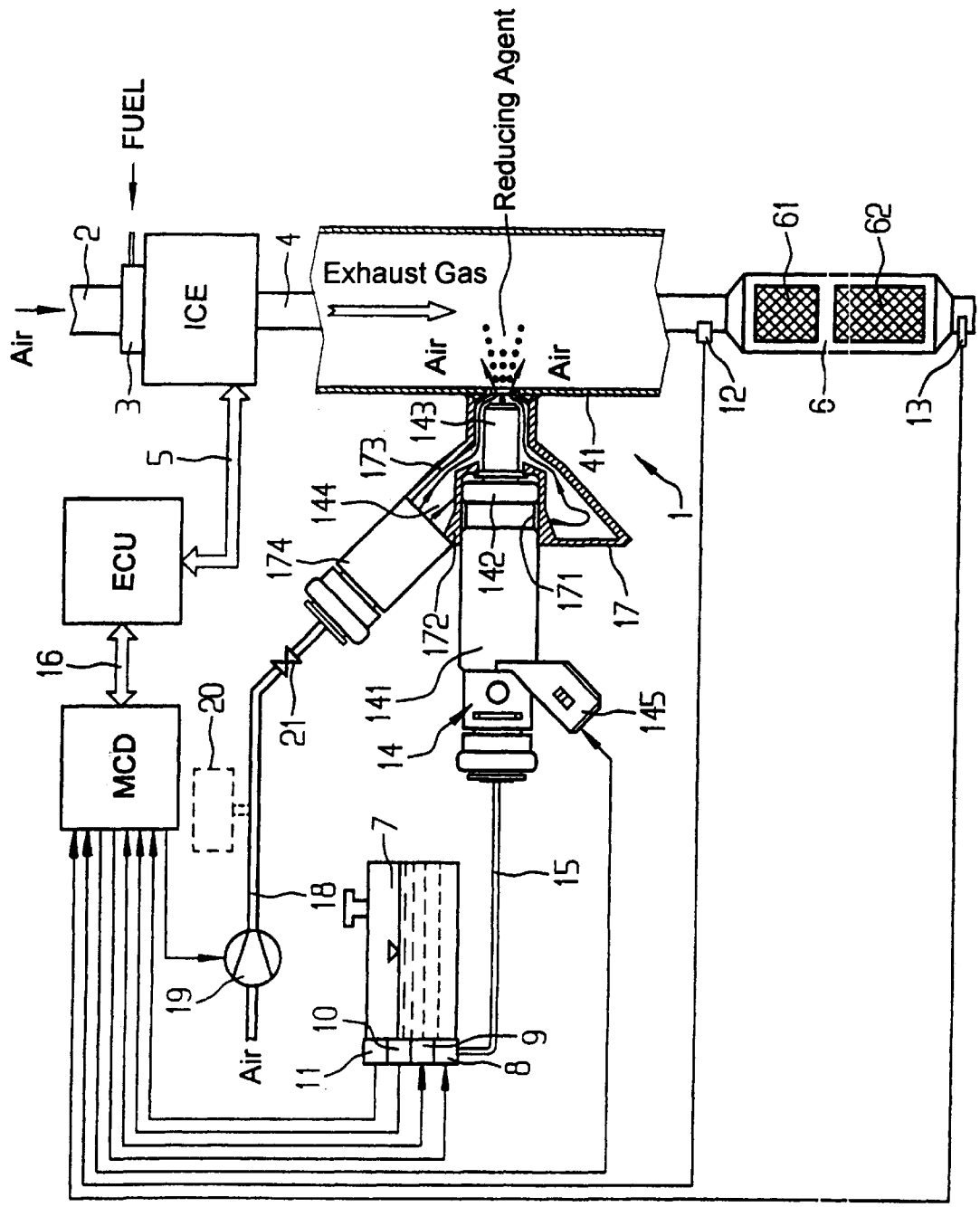
FIG. 1 is a schematic diagram of a first exemplary embodiment of the apparatus according to the invention.

Referring now to the figures of the drawing in detail and first, particularly, to FIG. 1 thereof, there is seen, in schematic diagram form and very simplified, an internal combustion engine ICE operated with excess air, together with an exhaust-gas after-treatment system 1 associated with it. In this case, only those parts which are needed for the understanding of the invention are illustrated. In particular, the illustration of the fuel circuit is omit ted . In this exemplary embodiment, a diesel internal combustion engine is shown as the internal combustion engine, and aqueous urea solution is used as the reducing agent for the after-treatment of the exhaust gas.

The internal combustion engine ICE is fed the air needed for combustion via an intake line 2. An injection system, which can be designed, for example, as a high-pressure storage injection system (common rail) with injection valves which inject fuel FUEL directly into the cylinders of the internal combustion engine ICE, is designated by the reference symbol 3. The exhaust gas from the internal combustion engine ICE passes via an exhaust-gas line 4 to the exhaust-gas after-treatment system 1.

In order to control and regulate the internal combustion engine ICE, an engine control unit ECU, known per se, is connected to the internal combustion engine ICE via a data and control line 5. Via the data and control line 5, signals from sensors (e.g. temperature sensors for intake air, charging air, coolant, load sensor, speed sensor) and signals for actuators (e.g. injection valve, actuating elements) are transmitted between the internal combustion engine ICE and the engine control unit ECU.

The exhaust-gas after-treatment system 1 has a reduction catalytic converter 6, which contains a number of catalytic converter units 61, 62 connected in series. In addition, an oxidation catalytic converter can be arranged in each case downstream and/or upstream of the reduction catalytic converter 6. Also provided is a metering control device MCD, which is assigned to a urea storage container 7 having an electrically driven delivery pump 8 for the urea. The urea storage container 7 has an electrical heating device 9 and sensors 10, 11, which register the temperature of the urea and the level in the urea storage container 7. In addition, the signals from a temperature sensor 12 arranged upstream of the reduction catalytic converter 6, and from a $NO_x$ measuring pick-up 13 arranged downstream of the reduction catalytic converter 6 are also further transmitted to the metering control device MCD.

The metering control device MCD controls an electromagnetic injection valve 14, to which urea is fed from the urea storage container 7 via a line 15 with the aid of the delivery pump 8. The injection of the urea by means of the injection valve 14 is carried out in the exhaust-gas line 4 upstream of the reduction catalytic converter 6.

During the operation of the internal combustion engine ICE, the exhaust gas flows through the exhaust-gas line 4 in the direction of the arrow just above the urea injection point in the exhaust gas line.

The metering control device MCD is connected to the engine control unit ECU via a bus system 16 for the purpose of mutual data transfer. Via the bus system 16, the operating parameters which are relevant to the calculation of the quantity of urea to be metered, such as the engine speed, air mass, fuel mass, control travel of an injection pump, exhaust-gas mass flow, operating temperature, charging-air temperature, injection start and so on, are transmitted to the metering control device MCD.

On the basis of these parameters and the measured values for the exhaust-gas temperature and the $NO_x$ content, the metering control device MCD calculates the quantity of urea to be injected. As it is injected into the exhaust-gas line 4, the urea is hydrolyzed and thoroughly mixed. The catalytic reduction of the $NO_x$ in the exhaust gas to form $N_2$ and $H_2O$ takes place in the catalytic converter units 61 and 62.

The injection valve 14 for introducing the urea into the exhaust-gas line 4 is a conventional low-pressure gasoline injection valve, which is plugged into a valve holding element 17 connected to a wall 41 of the exhaust-gas line 4 (shown partly in sectional illustration in the figure), and is subsequently mechanically locked, so that the injection valve 14 is centered in the radial and axial directions. For this purpose, the valve holding element 17 has, on its side facing away from the exhaust-gas line 4, a recess 171 which is matched to the diameter of the injection-valve body 141 and is bounded by an inner wall 172 so that, when the injection valve 14 is installed, its longitudinal axis is approximately at right angles to the wall 41 of the exhaust-gas line, and the outlet opening of the injection valve 14 is located slightly in front of or at the level of the wall 41 of the exhaust-gas line 4. The wall 41 is formed with a throughhole at which the reducing agent is injected. The sealing of the injection valve 14 in the recess 171 in the valve holding element 17 is effected by means of an O-ring seal 142 arranged at that end of the injection-valve body 141 pointing toward the wall 41.

The valve holding element 17 is of double-walled design, one wall forming the inner wall 172 enclosing the injection-valve body 141, the other wall being formed by an outer wall 173 of the valve holding element 17, the outer contour of the valve holding element 17 tapering like a funnel in the direction of the exhaust-gas line 4, so that both that part of the injection-valve body 141 which is fixed in the recess 171, and the valve tip 143 having a smaller diameter than the injection-valve body 141 are enclosed, forming an air gap 144.

The valve holding element 17 is permanently connected to the wall 41 of the exhaust-gas line 4 via the outer wall 173, for example being welded in the case of a metallic valve holding element 17. As an alternative to this, the valve holding element 17 can consist of temperature-resistant plastic or of a ceramic. The material used ought on the one hand to be a poor conductor of heat, in order that as little heat as possible is transferred from the exhaust gas and the exhaust-gas line to the injection valve, and on the other hand ought to have a sufficiently high mechanical strength, in order to accommodate the injection valve and also to hold it reliably during the operation of the internal combustion engine.

The injection valve 14 has an electrical connection 145, via which it is connected to the metering control device MCD by means of corresponding signal lines.

In addition, a connecting piece 174 for the connection of a pressurized-air line 18 is provided on the valve holding element 17. Cooling air for cooling the injection valve 14 is fed in via the pressurized-air line 18. The connection of the pressurized-air line 18 can advantageously be made in this case by means of a conventional quick-action coupling.

The pressurized-air generator used is, for example, a pump 19 which is driven electrically via signals from the metering control device MCD, preferably a secondary-air pump such as is known for exhaust-gas after-treatment in spark-ignition engines, or a pump that is mechanically driven via the crankshaft of the internal combustion engine.

As an alternative to this, the pressurized air for cooling the injection valve 14 in the case of supercharged internal combustion engines can be taken via a throttled branch downstream of the charging-air cooler, and fed to the injection valve 14. This has the advantage that the temperature of the cooling air is relatively low and, as a result, the cooling effect for the injection valve is high.

In the case of utility vehicles which have a pressurized-air line network to which the pressurized-air braking system and further additional devices are connected, the cooling air can be taken from this network or from a secondary pressurized-air circuit.

The flow of the cooling air in the air gap 144 within the valve holding element 17 is identified by arrow symbols.

During the operation of the internal combustion engine, the injection valve 14 is driven intermittently, depending on the current operating parameters of the internal combustion engine ICE and of the reduction catalytic converter 6. The pressurized-air generator, for example the electric pump 19, is likewise driven, so that cooling air flows via the pressurized-air line 18 and the connecting piece 174 into the air gap 144 between the inner wall 172 and the outer wall 173 of the valve holding element 17. As a result, that part of the injection valve 14 which is close to the exhaust gas, in particular the valve tip 143, is flushed by cooling air. Because of the constructional configuration of the valve holding element 17, this cooling air is led over that end (jet outlet side) of the injection valve 14 which faces the exhaust gas, as a result of which the absorption of heat by the injection valve 14 from the exhaust gas is considerably reduced. The cooling air then flows into the exhaust-gas line 4 and is mixed there with the exhaust gas from the internal combustion engine. Since the proportion of the additional air introduced into the exhaust-gas line 4 for the cooling of the injection valve 14 is very low, as referred to the overall exhaust-gas mass flow in the exhaust-gas line 4 (typically about less than 1%), and the unburned constituents in the exhaust gas from a diesel engine or from a lean-burn spark-ignition engine are likewise very low, this has no noticeable influence on the conversion of the pollutants in the reduction catalytic converter 6.

By means of an appropriate constructional configuration of the transition from the end of the injection valve to the air guidance, the cooling-air stream can additionally be used for shaping the injection jet, which permits better preparation of the reducing agent, aqueous urea solution.

If an electrically driven pump 19 is used as the pressurized-air generator, then this opens up the possibility to maintain the cooling of the injection valve 14 further for a specific time span even after the internal combustion engine has been switched off. This can be done either under pure time control or under temperature control. Such an overrun of the pump 19 after the internal combustion engine ICE has been switched off provides an air cushion at the tip 143 of the injection valve and at the end (jet outlet side) of the injection valve 14 facing the exhaust gas, this air cushion preventing the exhaust heat (residual heat) of the exhaust-gas after-treatment system heating up the injection valve 14 and the reducing agent.

Instead of the overrun of an electrically driven pump for the cooling air, a pressure reservoir 20 (drawn with dashed lines in FIG. 1) can be provided in the pressurized-air line 18, being filled during the operation of the pump and still providing cooling air for a specific time span, which primarily depends on the volume of the pressure reservoir, after the internal combustion engine and the pressure generator have been switched off. Such a pressure reservoir 20 can also be used in supercharged internal combustion engines.

In order to prevent exhaust gases flowing back into the pressurized-air line 18 because of the exhaust-gas backpressure prevailing in the exhaust-gas line 4, a check valve 21 can be provided in the pressurized-air line 18. As an alternative to this, it is also possible to use for this purpose an electric valve which can be driven by the metering control device MCD.

FIG. 2 shows an exemplary embodiment in which the valve holding element 17 is arranged on an exhaust-gas line 4 of double-walled design. The construction and the function of the reducing-agent circuit and of the pressurized-air circuit are identical to the illustrations of FIG. 1 and are therefore not shown here. Double-walled exhaust-gas lines are used in order to reduce the heat losses and thus to support passive heating of the catalytic converter. The space 43 which is present between the individual walls 41, 42 of the exhaust-gas line 4, and serves as an air-gap insulator, is sealed by means of a suitable sealing and insulating element 44 (for example one made of ceramic) at the point at which the injection valve 14 opens into the exhaust-gas line 4. As a result, no reducing agent can get into the space 43 between the two walls 41, 42.

The invention has been shown with reference to two exemplary embodiments in which, when the injection valve is installed in the valve holding element, the longitudinal axis of the injection valve is approximately at right angles to a wall of the exhaust-gas line. However, it is also possible to modify the valve holding element in constructional terms such that when the injection valve 14 is installed, its longitudinal axis forms an acute angle with the wall 41 of the exhaust-gas line, as referred to the flow direction of the exhaust gas.

I claim:

1. An apparatus for after-treating exhaust gases of an internal combustion engine operating with excess air, comprising:
   a reduction catalytic converter for reducing $NO_x$ components in an exhaust gas flowing in an exhaust gas line of an internal combustion engine;
   an electrically driven metering device for controlled injection of reducing agent into the exhaust-gas line upstream of the reduction catalytic converter in a flow direction of the exhaust gas, said metering device having an injection valve and a double-walled valve holding element enclosing said injection valve and directly communicating with the exhaust-gas line, said double-walled valve holding element having an outer wall and an inner wall and an air gap formed therebetween; and
   a device for cooling the metering device, including a pressurized-air generating device connected to blow pressurized air into said air gap between said outer wall and said inner wall of said valve holding element, for cooling said injection valve in vicinity of the exhaust gas line.

2. The apparatus according to claim 1, wherein said valve holding element is attached to a wall of the exhaust gas line and the wall is formed with a throughhole for the reducing agent to be introduced, and wherein said valve holding element is formed, on a side facing away from the exhaust-gas line, with a recess matched to a diameter of said injection valve and is bounded by said inner wall such that, when said injection valve is installed, an outlet opening of said injection valve is located slightly in front of or at a level of the wall of the exhaust-gas line.

3. The apparatus according to claim 1, wherein an outer contour of said valve holding element tapers in a funnel shape towards the exhaust-gas line, such that an injection-valve body of said injection valve and a valve tip of said injection valve, having a smaller diameter than said injection-valve body, are both surrounded by said air gap.

4. The apparatus according to claim 3, wherein said outer wall of said valve holding element is permanently attached to a wall of the exhaust-gas line.

5. The apparatus according to claim 2, wherein said injection valve has a longitudinal axis oriented substantially perpendicular to the wall of the exhaust-gas line.

6. The apparatus according to claim 2, wherein said injection valve has a longitudinal axis oriented at an acute angle with the wall of the exhaust-gas line, relative to a flow direction of the exhaust gas.

7. The apparatus according to claim 1, wherein said valve holding element is formed of metallic materials.

8. The apparatus according to claim 1, wherein said valve holding element is formed of ceramic materials.

9. The apparatus according to claim 1, wherein said valve holding element is formed of temperature-resistant plastic material.

10. The apparatus according to claim 1, wherein said pressurized-air generating device is an electrically driven pump.

11. The apparatus according to claim 1, wherein said pressurized-air generating device is a pump mechanically driven by the internal combustion engine.

12. The apparatus according to claim 1, which comprises a pressurized-air line connecting said pressurized-air generating device to said valve holding element, and a pressure reservoir communicating with said pressurized-air line.

13. The apparatus according to claim 1, which comprises a pressurized-air line connecting said pressurized-air generating device to said valve holding element, and a check valve connected in said pressurized-air line.

14. A method of after-treating exhaust gases from an internal combustion engine operating with excess air and having an exhaust-gas after-treatment system, which comprises:
   introducing reducing agent into an exhaust-gas line with an electrically driven metering device comprising an injection valve enclosed by a double-walled valve holding element connected directly to the exhaust-gas line;
   generating pressurized air with a pressurized-air generating device and blowing the pressurized air into an air gap between an outer wall and an inner wall of the double-walled valve holding element, and thereby cooling at least those parts of the injection valve in vicinity to the exhaust gas by means of the pressurized air; and
   reducing $NO_x$ components in the exhaust gas by means of a reduction catalytic converter disposed downstream of the metering device, in an exhaust gas flow direction.

15. The method according to claim 14, wherein the generating step comprises generating the pressurized air with an electrically driven pump, and maintaining the pump active for a given time period after the internal combustion engine has been switched off.

16. The method according to claim 15, which comprises maintaining the pump activated until a predefined time span has expired after the internal combustion engine has been switched off.

17. The method according to claim 15, which comprises maintaining the pump activated until a temperature in the exhaust-gas line falls below a predefined value.

18. The method according to claim 14, which comprises filling a pressure reservoir with the pressurized-air generating device during an operation of the internal combustion engine and the metering device, and supplying pressurized air from the pressure reservoir for cooling the injection valve after the internal combustion engine has been switched off and the metering device has been deactivated.

19. The method according to claim 14, wherein the generating step comprises branching pressurized air from a pressurized-air circuit for controlling other functions of a vehicle driven by the internal combustion engine.

20. The method according to claim 14, wherein the generating step comprises branching off pressurized air via a throttled branch downstream of a charging-air cooler of a supercharged internal combustion engine.

* * * * *